E. HÉRISSÉ.
MACHINE FOR DIPPING CONFECTIONERY AND THE LIKE.
APPLICATION FILED OCT. 31, 1908.

915,291. Patented Mar. 16, 1909.

3 SHEETS—SHEET 1.

Witnesses:
Inventor: Émile Hérissé

E. HÉRISSÉ.
MACHINE FOR DIPPING CONFECTIONERY AND THE LIKE.
APPLICATION FILED OCT. 31, 1908.
915,291.
Patented Mar. 16, 1909.
3 SHEETS—SHEET 2.
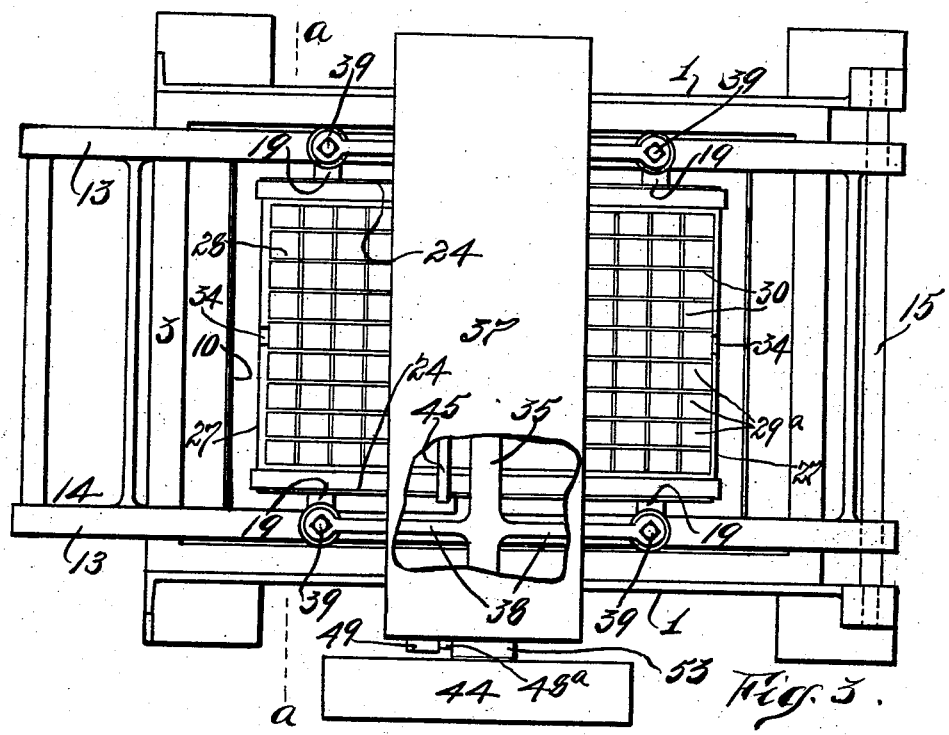
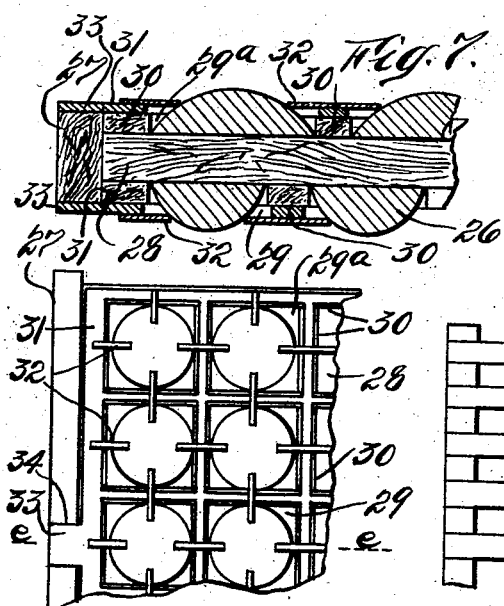
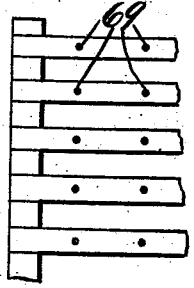
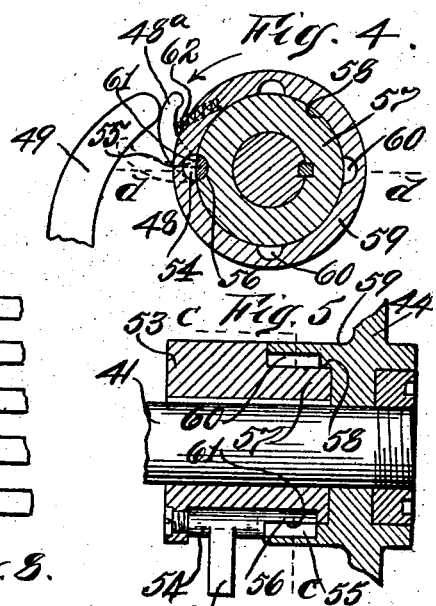

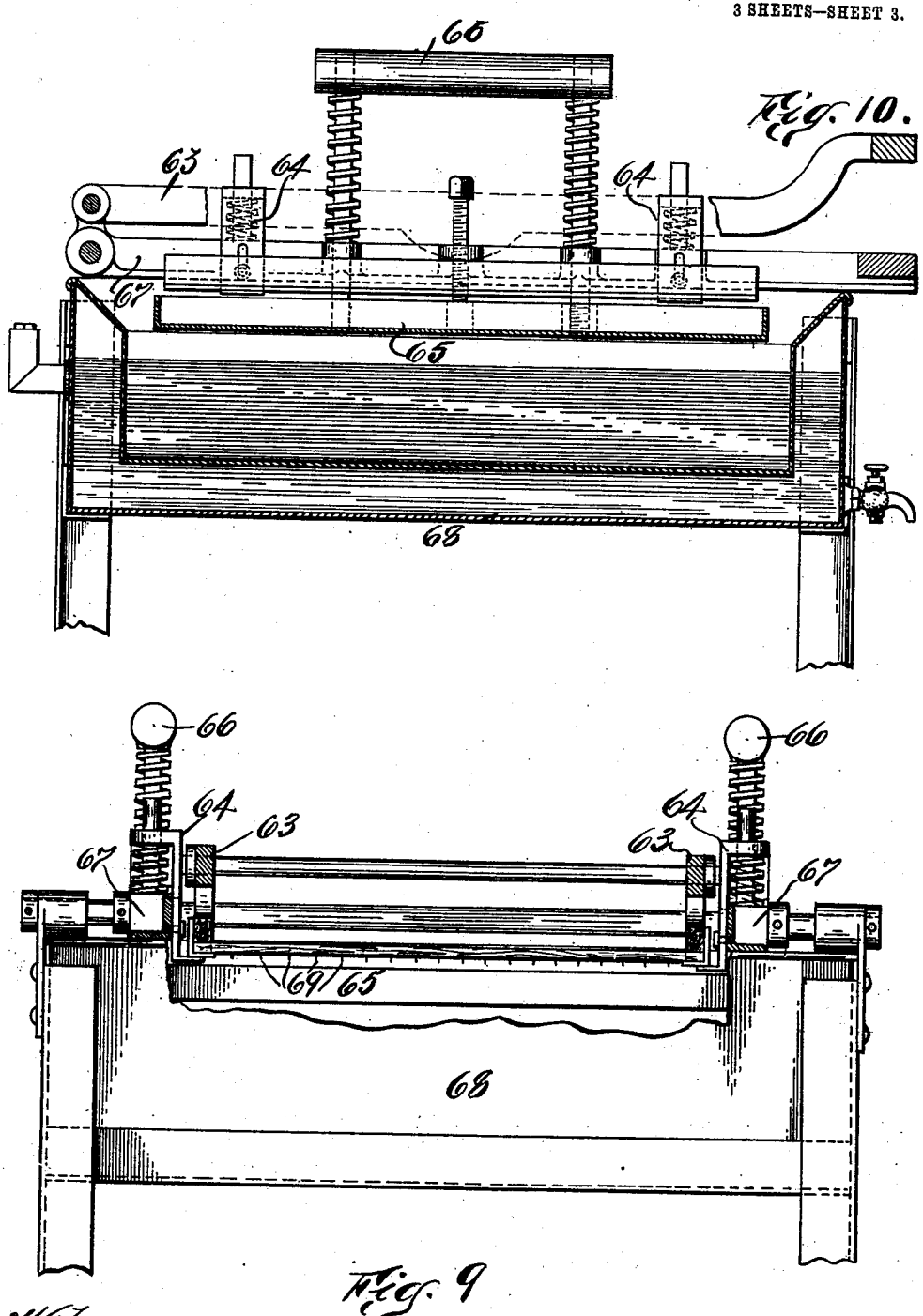

UNITED STATES PATENT OFFICE.

EMILE HÉRISSÉ, OF NEW YORK, N. Y.

MACHINE FOR DIPPING CONFECTIONERY AND THE LIKE.

No. 915,291.      Specification of Letters Patent.      Patented March 16, 1909.

Application filed October 31, 1908. Serial No. 460,376.

*To all whom it may concern:*

Be it known that I, EMILE HÉRISSÉ, a citizen of the United States, residing at New York city, borough of Manhattan, county and State of New York, have invented certain new and useful Improvements in Machines for Dipping Confectionery and the Like, of which the following is a clear, full, and exact description.

This invention relates to a machine which is designed to dip articles, more particularly cakes, confectionery, etc., into a confection, such as chocolate, for instance.

The object of this invention is to provide a machine that is adapted to facilitate the dipping or coating of biscuits, cakes and confections, or, in other words, to facilitate the coating of said cakes, etc., with chocolate or other confection of a similar nature, by dipping the said cakes wholly or partially into the molten confection; for instance, if I desire to put a small amount of chocolate on top of biscuits having marshmallows thereon, I place the biscuits in the machine and cause the tops or sides thereof to be dipped into molten chocolate, whereby the chocolate will adhere to the marshmallows or biscuits.

My improved machine is adapted to treat any kind of cake or confection, and any coating material, other than chocolate, can be used.

To carry out the object of my invention, I employ means whereby the coating material can be kept in a molten condition while the machine is in operation, or even if the machine is idle.

Other special features of improvement will appear throughout the specification, such as special means for retaining cakes and means coöperating with the retaining means to successfully carry out the cycle of operations.

I will now proceed to describe my invention in detail, the novel features of which I will finally claim, reference being had to the accompanying drawings, forming part hereof, wherein:—

Figure 1:
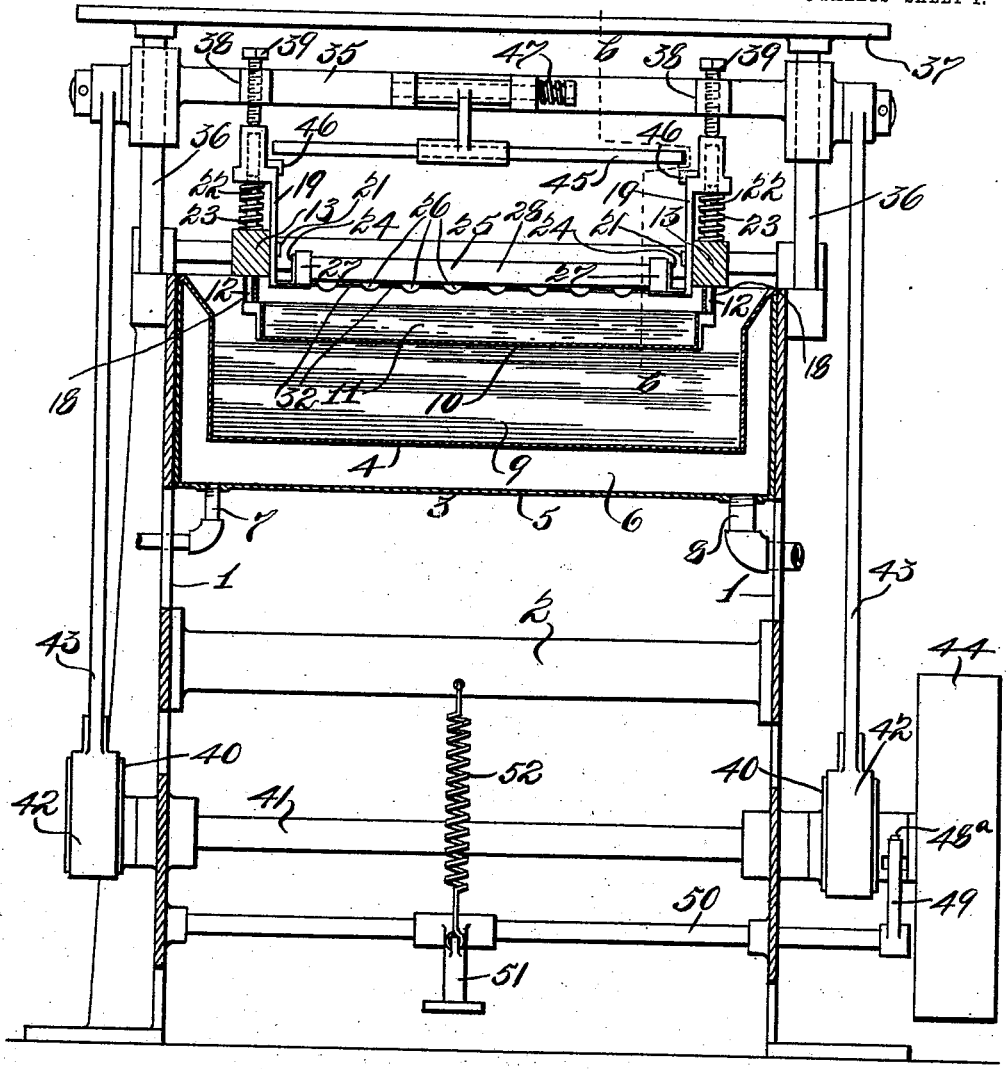
Figure 2:
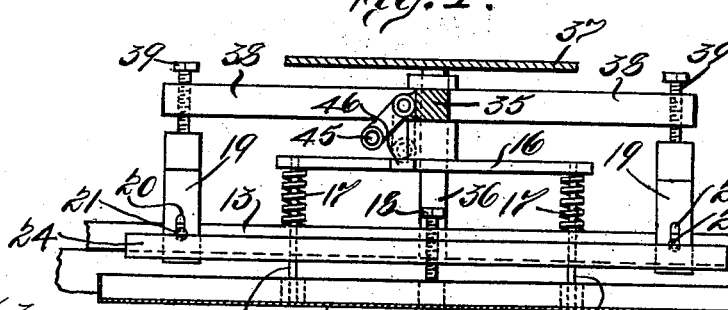

Figure 1 is a front elevation of my improved machine, partly in section, the section being taken on a line *a—a* in Fig. 3; Fig. 2 is a fragmentary sectional longitudinal view on a reduced scale of the top portion of my machine, the section being taken on a line *b—b* in Fig. 1; Fig. 3 is a top plan view of my improved machine, on a reduced scale, the top shelf being broken away, as shown; Fig. 4 is an enlarged detail sectional view of the clutch which controls the operation of my machine, the section being taken on a line *c—c* in Fig. 5; Fig. 5 is a longitudinal sectional plan view, the section being taken on a line *d—d* in Fig. 4; Fig. 6 is a fragmentary plan view of one form of a cake retaining frame, employed in my machine; Fig. 7 is an enlarged sectional view thereof, the sections being taken on a line *e—e* in Fig. 6; Fig. 8 is a fragmentary plan view of another form of cake retaining frame; Fig. 9 is a front view of a hand-operated machine, broken away as shown, embodying my improvements; and Fig. 10 is a central longitudinal sectional view thereof.

Referring now to the drawings, particularly to Fig. 1, my improved machine comprises frame members 1 which are bound together by a brace 2.

One of the special features of my machine comprises a reservoir 3, which is carried by the frame members 1, the said reservoir being composed of an inner case 4 and an outer case 5, the said casings being separated to form a chamber 6 into which a heating medium, such as steam or hot water, can be introduced. The said medium can be introduced into the chamber 6 through a pipe 7 and drawn off through an exhaust pipe 8. The reservoir 3 is designed to retain a confection, such as chocolate or similar substance, in a molten condition, the said substance being indicated by 9. To get the best results, the substance 9 must be kept in a molten condition, at a certain temperature, in order that the said substance will flow evenly and adhere to the articles dipped therein. To get this result, I construct the reservoir 3, as above mentioned, and introduce a heating medium under and around the inner case 4, which contains the substance 9, the said heating medium being adapted to keep the substance in the said molten condition.

Instead of dipping the articles directly into the substance 9, I employ a subsidiary receptacle 10, which is situated within the reservoir 3, in this instance, and adapted to be submerged in the substance 9 and filled, at intervals, with the said substance, as indicated by 11. When the receptacle 10 has been withdrawn from the molten substance, the said receptacle will be filled flush with the top thereof as shown. To adapt the receptacle 10 for a vertical or reciprocating movement, I mount the said receptacle upon rods 12 (Figs. 1 and 2) which are slidably carried by the side rails 13 of a frame 14 (see Fig. 3), the said frame being pivotally mounted on a rod 15 and adapted for movement longitudinally thereof. The rod 15 is carried by the frame member 1 as shown. Each pair of rods 12 on each rail 13 is connected by a bar 16 (see Fig. 2), springs 17 being interposed between the bars 16 and rails 13 for the purpose of withdrawing the receptacle from the molten material after the said receptacle has been submerged. To adjust the receptacle 10 relative to the cake retaining tray, I employ adjusting screws 18, which are adapted to bear against the said receptacle as shown in Fig. 2. The position of the receptacle relative to the tray is dependent upon the height of the articles to be dipped, also upon the extent to which the articles are to be dipped.

Adjacent to the receptacle 10, and upon the rails 13, I slidably mount tray-carriers 19, the said carriers being provided with a slot 20, through which a screw 21 passes, the said screws being adapted to slidably retain the carriers in position, as shown. The carriers 19 are held in alinement by means of studs 22 (Fig. 1), around which a spring 23 is wound. The springs 23 act to restore the tray-carriers 19 after each depression thereof.

Each pair of tray-carriers 19 are connected by an angle iron 24, the said angle iron serving as a retainer for a tray 25, the said tray being adapted to contain cakes 26. The tray 25 is removably supported by the said angle irons 24.

Various forms of trays can be used, but I have herein illustrated a form of tray comprising end members 27 and a central member 28 (see Figs. 7 and 8). The central member 28 is provided with sockets 29, 29$^a$, which are formed by battens 30. The cakes 26 are placed within the sockets 29, 29$^a$, as shown in Fig. 7. The sockets 29$^a$ are larger than the sockets 29 in order to accommodate larger cakes. In Fig. 1, the sockets 29 are the only ones shown in use. To hold the cakes in position in the sockets, I utilize a frame 31 having fingers 32, which are adapted to bear against the cakes and hold them in. The frame is provided with a projection 33, which is adapted to enter a slot 34 in the end members 27 of the tray and to be firmly held thereby. The frame 31 and fingers 32 prevent the cakes from being pulled out of the sockets when the tray is withdrawn from the molten material.

To depress the tray-carriers 19 at the proper time, I employ a reciprocating element which comprises a cross-head 35, slidably mounted on studs 36 carried by the frame member 1. The studs 36 are crossconnected at the upper end thereof by a shelf 37 which is adapted to hold a tray. The cross-head 35 is provided with arms 38, the ends of which are provided with adjusting screws 39, which in turn bear against the tops of the tray-carriers 19, as shown. The adjusting screws 39 regulate and control the downward movement of the tray carriers 19, or, in other words, the screws 39 can be so adjusted as to cause the cakes 26 to be depressed into the material 11 to any desired extent. The reciprocating movement of the cross-head is always the same in the herein embodied form of my invention.

To reciprocate the cross-head 35, I have in this instance utilized eccentrics 40, which are carried by a driving shaft 41. The eccentrics 40 transmit movement to the cross-head 35 through the straps 42 and rods 43. A driving pulley 44 rotates the shaft 41. The cross-head 35 is also adapted to depress the receptacle 10, whenever desired, by means of a cross-bar 45 pivotally mounted, as shown, on the cross-head 35. The bars 16 are provided with projections 46 against which the bar 45 will strike when pressed inwardly, as shown by dotted lines in Fig. 2. When the bar 45 is pressed inwardly, to aline with the projections 46, and the shaft 41 rotated, the receptacle 10 will be submerged in the molten material 11 and filled. This operation will take place, at intervals, when it becomes necessary to supply the receptacle 10 with fresh material. Normally the bar 45 will be kept out of alinement with the projection 46, by a spring 47, so that the said bar will not interfere with the operation of dipping the cakes. As the movement of the cross-head 35 will be intermittent and not constant, I loosely mount the pulley 44 on the shaft 41 and employ a clutch mechanism 48 (see Figs. 4 and 5) which is adapted to permit the shaft 41 to make one revolution only at a time. The clutch is controlled primarily by a lever 48$^a$ and secondarily by a lever 49 carried by a rotatable shaft 50, which in turn is rotated by a treadle 51 and counteracted by a spring 52 (see Fig. 1). The clutch mechanism comprises a sleeve 53, which is firmly keyed to the shaft 41. The sleeve 53 carries a rotatable stud 54, which at one end is cut away as at 55, leaving a semi-cylindrical projection 56. One end of the sleeve 53 is reduced, as at 57, and adapted to fit a counter-bore 58 in the hub 59 of the pulley 44. The counter-bore 58 of the hub 59 is counter-bored as at 60, the said counter-bore being of the same size as the projection 56 on the stud 54. While the lever 48$^a$ is held in the position shown in Fig. 4, the projection 56 will be held in the position shown, or in such a position as to keep the surface 61 in alinement with the surface of the counter-bore 58; therefore the pulley 44 can freely revolve without revolving the shaft 41.

Should I desire to revolve the shaft 41, I depress the treadle 51 and cause the lever 49 to leave the lever 48ª, whereby spring 62 will tend to force the lever 48ª outwardly, and when any one of the counter-bores 60 comes adjacent to the projection 56, the spring 62 will cause the lever 48ª to fly outwardly, whereby the projection 56 will be revolved and lock the sleeve 53 and hub 59 together (see dotted lines Fig. 4). As soon as the cross-head 35 commences to descend, the foot is removed from the treadle 51 and the lever 49 is forced back to its normal position by the spring 52. When the lever 48ª comes in contact with the lever 49, after one revolution has been completed, it, the lever 48ª, will be forced to its normal position again; whereby the sleeve 53 and hub 59 will unlock. After each reciprocation of the cross-head 35, a new tray is substituted for the tray containing the articles dipped.

The form of machine illustrated in Figs. 9 and 10 is the same as that illustrated in Figs. 1, 2 and 3, excepting that I employ a manually operated lever frame 63 to depress the tray-carriers 64, which are slidably mounted the same as the carriers 19. To depress, or submerge, the receptacle 65, I employ a cross-bar 66 as shown. The tray-carriers are operated when the lever frame 63 is pressed downwardly. The tray-carriers and receptacle operating means are carried by a pivotal frame 67, mounted as shown. When I desire to refill the reservoir 68, or to clean it, I lift the frame 67 upwardly, at the free end, whereby the receptacle 65 and tray-carriers are lifted free of the reservoir. To refill, or clean, the reservoir 3 (Fig. 1), I slide the frame 14 to one side, to clear the arms 38, and then lift the free end of the said frame, whereby the receptacle 10 and tray-carriers are lifted free of the reservoir.

Fig. 8 illustrates a lattice tray having pins 69 to hold the cakes; the frame 31 is also used with this form of tray.

Having now described my invention, what I claim and desire to secure by Letters Patent is:

1. In a dipping machine, the combination of a reservoir adapted to retain a confection in a molten condition, a reciprocating receptacle adjacent to said reservoir, means adapted to submerge said receptacle in the molten confection at intervals, whereby said receptacle is filled, an independent reciprocating element adjacent to said receptacle, means adapted to retain articles to be dipped, carried by said element, and means adapted to reciprocate said element to cause the articles carried thereby to be dipped into the confection in said receptacle at intervals.

2. In a dipping machine, the combination of a reservoir comprising an inner and an outer casing, means adapted to introduce a heating medium between said casings, whereby a confection in said reservoir can be kept in a molten condition, a reciprocating receptacle adjacent to said reservoir, means adapted to submerge said receptacle in the molten confection at intervals, whereby said receptacle is filled, an independent reciprocating element adjacent to said receptacle, means adapted to retain articles to be dipped, carried by said element, and means adapted to reciprocate said element, to cause the articles carried thereby to be dipped in the confection in said receptacle at intervals.

3. In a dipping machine, the combination of a reservoir comprising an inner and an outer casing, means adapted to introduce a heating medium between said casings, whereby a confection in said reservoir can be kept in a molten condition, a movable receptacle adjacent to said reservoir, means adapted to submerge said receptacle in the molten confection at intervals, whereby said receptacle is filled, an independent movable element adjacent to said receptacle, means, adapted to retain articles to be dipped, carried by said element, and means adapted to move said element, to cause the articles carried thereby to be dipped in the confection in said receptacle at intervals.

4. In a dipping machine, the combination of a reservoir, means adapted to heat said reservoir, whereby a confection can be kept in a molten condition, a reciprocating receptacle adjacent to said reservoir adapted to contain molten confection, a reciprocating carrier adjacent to said receptacle, a tray removably supported by said carrier and adapted to retain articles to be dipped, a reciprocating cross-head adapted to actuate said receptacle and said carrier, and means adapted to reciprocate said cross-head.

5. In a dipping machine, the combination of a heated reservoir adapted to retain a confection in a molten condition, an auxiliary receptacle adapted to receive molten confection from said reservoir, a movable carrier adjacent to said receptacle, a tray carried by said carrier, said tray comprising a member provided with sockets adapted to receive the articles to be dipped, a frame adapted for attachment to said socketed member and fingers carried by said frame adapted to hold said articles in said sockets.

6. In a dipping machine, the combination of a heated reservoir adapted to retain a confection in a molten condition, a movable carrier adapted to retain articles to be dipped in the confection from said reservoir, a constantly rotating element, means adapted to cause said rotating element to operate said carrier at intervals, and a manually operated device adapted to control the movement of said carrier operating means.

7. In a dipping machine, a receptacle adapted to contain a coating element, a movable carrier adapted to retain articles to be dipped, and means adapted to impart to said carrier an intermittent movement.

8. In a dipping machine, a receptacle adapted to contain a coating element, a movable carrier adapted to retain articles to be dipped, means adapted to impart movement to said carrier, and means adapted to control the extent of the dipping of said articles.

9. In a dipping machine, the combination of a reservoir adapted to retain a coating element, a movable frame, a receptacle adapted to receive coating material from said reservoir carried by said frame, a carrier adapted to retain articles to be dipped also carried by said frame, and means adapted to impart movement to said carrier, said frame being adapted to be moved in such a manner as to carry said receptacle and said carrier away from said receptacle.

Signed at New York city, N. Y., on this 30th day of October, 1908.

EMILE HÉRISSÉ.

Witnesses:
    EDUARD A. JARVIS,
    ABRAM SHLIVEK.